United States Patent Office 2,967,150

Patented Jan. 3, 1961

1

2,967,150

LOW SURFACE AREA MUD

Charles L. Prokop, Houston, John W. Graham, Bellaire, and Richard A. Salathiel, Houston, Tex., assignors, by mesne assignments, to Jersey Production Research Company, Tulsa, Okla., a corporation of Delaware No Drawing. Filed Mar. 21, 1957, Ser. No. 647,449

6 Claims. (Cl. 252—8.5)

The present invention is directed to a suspension of finely divided solids in an aqueous medium for use in well drilling operations. More particularly, this invention is directed to a drilling mud for use with certain surface-active agents that produce preferential wetting of the surfaces of materials containing hydrocarbons by the hydrocarbons present therein. Surface-active agents of this type are described in copending application Serial No. 605,671 for "Logging Method," filed August 22, 1956, by John W. Graham et al., now U.S. Patent No. 2,873,423.

The present invention may be briefly described as involving a drilling mud comprising, in addition to a weighting agent consisting of calcium carbonate or barium sulphate or a mixture thereof, at least ½ pound of guar seed gum (also termed guar flour), up to about 10 pounds of starch, and a preservative for the guar seed gum and the starch.

In the rotary method of drilling boreholes, an aqueous suspension of finely divided solids, commonly referred to as drilling mud, is pumped down the drill stem through the openings in the drill bit and upwardly through the annular space between the drill step and the walls of the borehole to the surface of the earth. A primary purpose for employing the drilling mud is to pick up the cuttings produced by the drill bit and to transport these cuttings to the surface of the earth. The drilling mud also serves other important functions, such as lubricating the bit and the drill stem, cooling the bit, and furnishing a hydrostatic pressure head to prevent flow into the borehole of formation fluids, such as oil, gas and water, from the various strata penetrated by the drill bit. In certain cases, it is highly desirable that the mud form a thin, difficultly permeable coating on the walls of the borehole for the purpose of reducing loss of water from the borehole to the formation and thereby reduce softening of the borehole and caving into the drill hole.

In connection with the electrical logging of boreholes, a technique has been developed wherein an electrical log of the borehole is obtained, following which various surface-active, reverse-wetting, agents are inserted in the drilling mud, which chemicals cause preferential wetting of the surfaces of earth formations at said borehole by any hydrocarbons present in the earth formations contacted thereby. After the contacting operation, an electrical log is again obtained of the borehole. As a result, two electrical logs are obtained wherein the contacted formations indicate a different electrical resistivity or potential when hydrocarbons are present than the electrical resistivity or potential prior to the contacting operations. By virtue of the difference in the electrical resistivity or potential in those formations wherein hydrocarbons are present, it is possible to determine accurately the presence of hydrocarbons, such as oil, gas and the like, in the particular formations. Such a technique is described in the aforementioned U.S. Patent No. 2,873,423.

Surface-active agents that have been found to be effective consist of cationic salts, specifically certain of the amine salts and certain quarternary ammonium salts. The organic amine base used for the preparation of the amine salts is selected from primary, secondary, and tertiary alkyl, aryl, and aralkyl amines which contain no combined atoms other than carbon, hydrogen and nitrogen in the molecule, and in which the ratio of combined atomic weights of carbon and hydrogen atoms for each basic nitrogen atom in the molecule is in the range from 125 to 300, and which have dissociation constants (for hydroxyl ion in aqueous solution of the base) within the limits of $1\times10^{-6}$ to $1\times10^{-3}$. The acids to be reacted with the amine bases may be acetic, hydrochloric, sulphuric, formic, propionic, citric, lactic, nitric, or phosphoric. When the water in the drilling fluid is essentially free of salt, it is preferable to use organic bases near the upper limit of the above-specified range of ratios of carbon and hydrogen to basic nitrogen. As the salinity of the water increases, the basic materials will decrease in solubility, so it is desirable to use organic bases near the lower end of the above-recited range.

An example of surface-active agents suitable for use with this invention is Armac CD–50, which is a mixture of alkyl-amine acetate from $C_8$ to $C_{18}$, predominately $C_{12}$ and $C_{14}$ with a minor amount of $C_{18}$ with one point of unsaturation. More specifically, the composition is 8% octyl, 9% decyl, 47% dodecyl, 18% tetradecyl, 8% hexadecyl, and 5% octadecyl amine acetate. Other reverse wetting agents that may be utilized are: octadecyl amine acetate, cetyl dimethyl amine acetate; Tetrosan, a cationic surfactant sold by Onyx Oil and Chemical Co., Jersey City, N.J.; Acetate of Primene JM–T, a mixture of primary amines with branched chains containing from 15 to 20 carbon atoms, sold by Rohm and Haas; Arquad C–2 which is dicoco dimethyl ammonium chloride prepared from coconut oil; amine acetate prepared from Primene 81–R, which is a mixture of primary amines containing branched chains of 12 to 15 carbon atoms, sold by Rohm and Haas; alkyl tolylmethyl trimethyl ammonium chloride, lauryl benzyl dimethyl ammonium chloride, bis quarternary salts such as the reaction product of 2 octyl benzyl chloride with bis dimethyl amino butylene, and the reaction product of nonyl benzyl chloride with bis dimethyl amino butene; di-isobutyl cresoxyethyl dimethyl benzyl ammonium chloride; and di-isobutyl phenoxyethoxy ethyl dimethyl benzene ammonium chloride.

In order for the surface-active agents to be effective, it is necessary that they penetrate the permeable coating on the walls of the borehole, commonly referred to as the "filter cake," and contact the earth formations behind the filter cake. Unfortunately, the clayish materials used heretofore in drilling muds present an extremely high surface area to the surface-active agents. This can be best understood when it is realized that the clays are composed of extremely finely divided particles. Manifestly, the more finely divided are the particles, the more total surface area the particles will present to a surface-active agent such as described in the aforementioned U.S. Patent No. 2,873,423. As a result of the high surface area presented by clays, it is very difficult for the surface-active agents to penetrate the filter cake and contact the earth formations behind the cake in sufficient quantities to be effective in conjunction with the aforedescribed electrical logging method.

Furthermore, certain of the surface-active agents, such as the amine salts including amine acetates, are rendered virtually insoluble in drilling fluids having a pH in excess of about 8.5. The preservatives and pH control agents used heretofore in drilling muds have resulted in muds having a relatively high pH considerably in excess of the pH of about 8.5 or less required by amine acetates.

It is, therefore, an object of the present invention to provide a drilling fluid adapted for use with surface-active agents that must penetrate the filter cake on the walls of a borehole.

Still another object is to provide a dispersion or suspension of finely divided solid material in an aqueous medium containing surface-active agents that tend to be absorbed on the surfaces of material contacted thereby that will absorb a minimum amount of said surface-active agents.

Another object is to provide a drilling fluid including materials that give the fluid a low pH factor.

The method of the present invention may be briefly described as preparing a drilling fluid having an aqueous vehicle to which has been added up to 10 pounds of starch and between ½ to 2 pounds of guar seed gum per 42 gallon barrel of mud and a granular weighting agent (consisting of barium sulphate, calcium carbonate or a mixture thereof) at least sufficient in amount to substantially aid starch and guar seed gum in lowering the filtration rate of the drilling mud, contacting the sides of a borehole with the drilling fluid to form a water permeable filter cake, and contacting the filter cake with a reverse-wetting surface-active agent adapted to preferentially wet earth formations by hydrocarbons present therein.

The composition of the present invention may be described briefly as a mixture of calcium carbonate and/or barium sulphate added to either fresh or saline water in conjunction with a surface-active agent of the kind that preferentially wets surfaces of hydrocarbon-containing material by the hydrocarbons present therein, in conjunction with between ½ to 2 pounds of guar seed gum and up to about 10 pounds of starch per barrel of drilling fluid in addition to a suitable preservative therefor.

Guar seed gum is a natural vegetable colloid commercially produced in the form of a powder. Commercial guar seed gum is a component of the legumenous seed *Cyamopis tetragonaloba*. The gum occurs in the endosperm of these seeds where its natural function is to reserve food supply for the developing plant. Guar seed gum is a polysaccharide consisting of a complex carbohydrate polymer of galactose and mannose and is chemically classified as a glactomannan.

Calcium carbonate and/or barium sulphate in the drilling fluid serve the purpose of providing a bed against which the pasted or gelantinized starch and the guar seed gum are held for the process of depositing a filter cake. These materials also add density to the suspension, which commonly must be higher than the density of water. At least a small amount of the calcium carbonate or barium sulphate must be present in the mud to provide a suitable filter cake and larger amounts are used as required to provide the desired fluid density. In practice, the calcium carbonate may range between 20 to 400 pounds per 42 gallon barrel of water, preferably between 75 to 150 pounds for good porosity of fluid through the cake. Barium sulphate may be added either alone or in combination with the calcium carbonate in amounts up to 600 pounds per 42 gallon barrel of water. It is to be noted that both of these materials are of a granular nature, having a very small surface area per pound in comparison with the surface area per pound of clay.

Guar seed gum is added in the amount of ½ to 2 pounds (and preferably between ½ and 1¼ pounds) per 42 gallon barrel of drilling fluid. From 0 to 10 pounds of starch per 42 gallon barrel of drilling fluid is added, preferably between 1 and 3 pounds of starch per barrel of drilling fluid. Paraformaldehyde, which does not raise the pH, may be added as a preservative in the amounts of 0.3 to 0.6 pound per 42 gallon barrel of drilling fluid. Paraformaldehyde may be employed as a preservative in muds having a pH less than 8.0 and is thus suitable for use with all of the reverse-wetting agents specified in the aforementioned U.S. Patent No. 2,873,423.

As mentioned before, the drilling fluid may have as its vehicle either fresh water or salt water. However, if salt water is used, the concentration of salt therein should be not greater than about 5% if the amine acetates are used as surface-active agents, and not greater than 10% if surface-active agents more tolerable of saline solutions than the amine acetates are utilized.

The present invention may be considered in connection with the following examples which are given by way of illustration and not intended as a limitation on the scope of this invention.

*Example I*

A drilling mud was prepared by incorporating into each 42 gallon barrel of salt water of 0.5% salinity one pound of guar seed gum, 3 pounds of starch, .5 pound of paraformaldehyde, and 100 pounds of calcium carbonate (finely ground). Into this fluid was added 8 pounds of coco amine acetate which was found to be readily soluble in the fluid. It was found that this fluid formed a filter cake having a water loss of about 12.0 cc. API and that the drilling fluid had a weight of 9.4 pounds per gallon and a viscosity of 40 sec. API. The drilling fluid does not render the amine acetate ineffective as a wetting agent, can be controlled easily as a drilling fluid, and is almost immune to contamination.

*Example II*

A drilling mud was prepared by incorporating into each 42-gallon barrel of salt water of 0.5% salinity, one pound of guar seed gum, 3 pounds of starch, 0.5 pound of paraformaldehyde, and 100 pounds of calcium carbonate (finely ground). A filter cake was formed using this drilling fluid and the drilling fluid was thereupon displaced by a solution of 8 pounds of coco amine acetate per 42-gallon barrel of water. A first resistivity log was run on the borehole after the filter cake was formed and before the coco amine acetate solution was injected into the borehole. A second resistivity log was run after the filter cake was contacted by the coco amine acetate solution.

The nature and objects of the invention having been particularly described, what is claimed is:

1. A drilling fluid consisting essentially of: water having from 0 to 10% by weight of salt dissolved therein to which has been added a surface-active agent consisting of a cationic salt to preferentially wet earth formations by hydrocarbons present in the earth's formations contacted thereby; between ½ and 2 pounds of guar seed gum and up to 10 pounds of starch per 42 gallon barrel of drilling fluid; and a weighting agent selected from the group consisting of calcium carbonate, barium sulphate, and mixtures of calcium carbonate and barium sulphate sufficient in amount to substantially aid said starch and guar seed gum in lowering the filtration rate of said drilling fluid.

2. A drilling fluid consisting essentially of: water having from 0 to 5% by weight of salt dissolved therein to which has been added an amine salt surface-active agent to preferentially wet earth formations by hydrocarbons present in earth formations contacted thereby; between ½ and 1¼ pounds of guar seed gum and up to 3 pounds of starch per 42 gallon barrel of drilling fluid; and a weighting agent selected from the group consisting of calcium carbonate, barium sulphate, and mixtures of calcium carbonate and barium sulphate sufficient in amount to substantially aid starch and guar seed gum in lowering the filtration rate of said drilling fluid.

3. A drilling fluid consisting essentially of: water having from 0 to 3% by weight of salt dissolved therein to which has been added an amine salt surface-active reverse-wetting agent to preferentially wet earth formations by hydrocarbons present in earth formations contacted thereby; from ½ to 1¼ pounds of guar seed gum and up to 3 pounds of starch per 42 gallon barrel of drilling fluid; and between 20 and 400 pounds of calcium carbonate and between .3 and .6 pound of paraformaldehyde per 42 gallon barrel of drilling fluid.

4. A drilling fluid consisting essentially of: water having from 0 to 10% by weight of salt dissolved therein to which has been added a surface-active agent consisting of a cationic salt to preferentially wet earth formations by hydrocarbons present in the earth's formations contacted thereby; between ½ and 2 pounds of guar seed gum and up to 10 pounds of starch per 42 gallon barrel of drilling fluid; and between 20 and 400 pounds of calcium carbonate and between .3 and .6 pound of paraformaldehyde per 42 gallon barrel of drilling fluid.

5. A drilling fluid consisting essentially of: water having from 0 to 5% by weight of salt dissolved therein to which has been added an amine salt surface-active agent to preferentially wet earth formations by hydrocarbons present in earth formations contacted thereby; the organic amine base used for preparation of said amine salt being selected from the group consisting of primary, secondary, and tertiary alkyl, aryl, and aralkyl amines which contain no combined atoms other than carbon, hydrogen and nitrogen in the molecule, and in which the ratio of combined atomic weights of carbon and hydrogen atoms for each basic nitrogen atom in the molecule is in the range from 125 to 300, and which have dissociation constants (for hydroxyl ion in aqueous solution of the base) within the limits of $1\times10^{-6}$ to $1\times10^{-3}$; between ½ and 1¼ pounds of guar seed gum and up to 3 pounds of starch per 42 gallon barrel of drilling fluid; and a weighting agent selected from the group consisting of calcium carbonate, barium sulphate, and mixtures of calcium carbonate and barium sulphate sufficient in amount to substantially aid starch and guar seed gum in lowering the filtration rate of said drilling fluid.

6. A drilling fluid consisting essentially of: water having from 0 to 5% by weight of salt dissolved therein to which has been added an amine salt surface-active agent to preferentially wet earth formations by hydrocarbons present in earth formations contacted thereby; said amine salts being formed by reacting an acid selected from the group consisting of acetic, hydrochloric, sulphuric, formic, propionic, citric, lactic, nitric, and phosphoric acids with an organic amine base selected from the group consisting of primary, secondary, and tertiary alkyl, aryl, and aralkyl amines which contain no combined atoms other than carbon, hydrogen, and nitrogen in the molecule, and in which the ratio of combined atomic weights of carbon and hydrogen atoms for each basic nitrogen atom in the molecule is in the range from 125 to 300, and which have dissociation constants (for hydroxyl ion in aqueous solution of the base) within the limits of $1\times10^{-6}$ to $1\times10^{-3}$; between ½ and 1¼ pounds of guar seed gum and up to 3 pounds of starch per 42 gallon barrel of drilling fluid; and a weighting agent selected from the group consisting of calcium carbonate, barium sulphate, and mixtures of calcium carbonate and barium sulphate sufficient in amount to substantially aid starch and guar seed gum in lowering the filtration rate of said drilling fluid.

References Cited in the file of this patent

UNITED STATES PATENTS

| | | |
|---|---|---|
| 2,331,594 | Blair | Oct. 12, 1943 |
| 2,364,434 | Foster | Dec. 5, 1944 |
| 2,371,955 | Dawson | Mar. 20, 1945 |
| 2,417,307 | Larsen | Mar. 11, 1947 |
| 2,606,871 | Ten Brink | Aug. 12, 1952 |
| 2,691,757 | Bartolini | Oct. 12, 1954 |
| 2,793,188 | Swain et al. | May 21, 1957 |
| 2,854,407 | Mallory | Sept. 30, 1958 |
| 2,873,423 | Graham et al. | Feb. 10, 1959 |
| 2,900,337 | Earley et al. | Aug. 18, 1959 |

OTHER REFERENCES

Rogers: Composition and Properties of Oil Well Drilling Fluids, second ed., pub., 1953, by Gulf Pub. Co. of Houston, Texas, pages 419 and 420.